July 18, 1944.  H. KLEMPERER  2,353,733
WELDING SYSTEM
Filed July 3, 1943
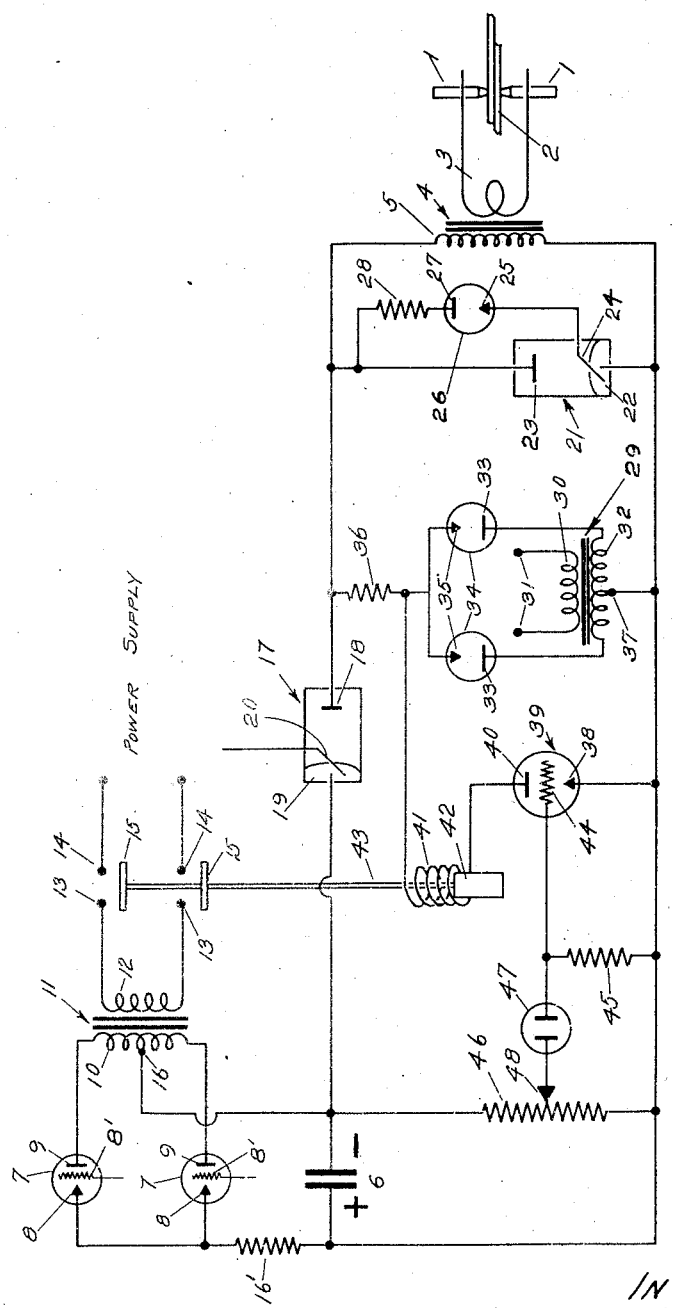
INVENTOR.
HANS KLEMPERER,
BY Elmer J. Gorn
ATTY.

Patented July 18, 1944

2,353,733

UNITED STATES PATENT OFFICE 2,353,733

WELDING SYSTEM

Hans Klemperer, Belmont, Mass., assignor to Raytheon Manufacturing Company, Newton, Mass., a corporation of Delaware Application July 3, 1943, Serial No. 493,403

11 Claims. (Cl. 320—1)

This invention relates to a resistance welding system of the type in which a controlled impulse of electrical energy is discharged through a transformer to deliver welding current to a resistance welding load.

In such systems electrical energy from a suitable source is supplied to an energy storage device, such as a condenser, and subsequently discharged through the welding transformer by way of a suitably controlled circuit. The condenser is charged to a predetermined voltage so that successive energy impulses supplied to the welding transformer will be uniform. Since the direction of the welding impulse through the transformer is in one direction only, it is desirable to reset the flux in the transformer after each welding impulse, otherwise the core of the transformer might become saturated or partially saturated so that the energy transferred to the welding load during successive welding impulses would not be uniform even though the condenser were charged to the same potential for each impulse. Should the flux reset circuit fail while the condenser charging and discharging circuits continue to function a number of defective or non-uniform welds may be made before the situation becomes apparent.

It is among the objects of the present invention to provide a means for disconnecting the condenser or other energy storage means from the source of power upon failure of the flux reset current.

In systems of the type to which the invention relates it is desirable that the condenser be charged rapidly. For this reason the maximum charging voltage is preferably well above the maximum charging rating of the condenser, so as to prevent slow charging of the condenser at the voltages approaching its maximum voltage rating.

A further object of this invention is to provide a means responsive to the flux reset current and to the charge upon the condenser effective to disconnect the condenser from the power supply source upon either the failure of said flux reset current or the charging of said condenser beyond a predetermined maximum voltage.

It is a further object of the invention to provide an improved system for preventing the charge on the condenser from exceeding a predetermined maximum value.

The above and other objects and features of the invention will be made fully apparent to those skilled in the art from a consideration of the following detailed description taken in conjunction with the accompanying drawing forming a part thereof and in which the single figure shows a schematic diagram of a resistance welding system embodying my invention.

Referring to the drawing, reference numeral 1 indicates a pair of resistance welding electrodes, one or both of which are movable to engage the work 2. Current is supplied to the electrodes 1 from the secondary winding 3 of a welding transformer 4 having a primary winding 5. The primary winding 5 is adapted to be energized by the discharge of a large condenser 6 which may be a bank of electrolytic condensers. The condenser 6 is adapted to be charged from any suitable source of direct current. In the instance shown such direct current is supplied by a pair of rectifier tubes 7. These tubes may be of a gas or vapor filled type having permanently energized cathodes 8. These cathodes may be thermionic filament, or any other suitable type of cathode. The rectifier tubes 7 may be provided with control grids 8' for controlling the charging of the condenser 6 to a predetermined maximum voltage. The rectifier tubes 7 are provided with anodes 9 which are connected to the opposite sides of the secondary winding 10 of a charging transformer 11. The charging transformer 11 is provided with a primary winding 12, the opposite ends of which are connected to contacts 13—13, which contacts are adapted to be connected to terminal contacts 14—14 of a suitable source of alternating current by armatures 15—15. The positive side of the condenser 6 is connected to the two cathodes 8—8 of the rectifier tubes 7—7 through an impedance, and the opposite side of the condenser is connected to a center tap 16 of the secondary winding 10.

The condenser 6 is thus continuously charged by the rectifier tubes 7—7 through a suitable impedance 16' which may be a resistance of sufficient value to maintain the proper charging rate for the condenser. The condenser 6 is discharged through the primary winding 5 of the transformer 4, the timing of this discharge being controlled by an ignition discharge tube 17. The tube 17 is preferably of the type provided with an anode 18, a pool cathode 19, and a suitable igniter 20 for initiating a cathode spot on the pool in order to cause the tube to conduct current. It will be understood that igniting impulses are supplied to the igniter 20 from any suitable source timed to initiate the discharge of the condenser 6 through the transformer 5 at the instant it is desired to apply a welding impulse to the work.

A shunt tube 21, which is preferably of the same type as the tube 17, having a pool type cathode 22, an anode 23, and an igniter 24, is connected across the opposite ends of the primary 5 to provide a shunt path for the decay current of the transformer 4 in a manner that is well understood in the art. To fire the tube 21 I prefer to connect the igniter 24 of said tube to the cathode 25 of a rectifier tube 26 which has its anode 27 connected in series with a current limiting resistance 28 to the line between the primary 5 of the transformer 4 and the anode 18 of tube 17.

In order to reset or reverse the flux in the core of the transformer 4, I provide a source of direct current which may pass continuously through the primary winding 5 of the welding transformer 4 in a direction inverse to the impulse of welding current therethrough. In the instance shown the source of direct current for flux reset comprises a transformer 29 having a primary winding 30, the terminals 31 of which are connected to a suitable source of alternating current. The secondary winding 32 of the transformer 29 has its opposite ends connected to the anodes 33 of a pair of rectifying tubes 34, the cathodes 35 of which are connected through a current limiting resistance or impedance 36 to the line between the anode 18 of the tube 17 and the primary winding 5 of the transformer 4. The secondary winding 32 of the transformer 29 is provided with center tap 37 which is connected to the opposite end of the primary winding 5.

The center tap 37 of the primary winding 32 is also connected to the cathode 38 of a controlled rectifying tube 39, which rectifying tube has its anode 40 connected by way of an energizing coil 41 surrounding a relay plunger 42 to the cathodes 35 of rectifying tubes 34 at a point between these cathodes and the resistance 36. The cathode 38 is preferably of the permanently energized type. The relay plunger 42 is provided with a rod 43 for actuating the armatures 15. The tube 39 is provided with a grid 44, which grid is connected by way of a resistance 45 to the positive side of the condenser 6. A resistance 46 is connected across the condenser 6 and the grid 44 is connected to an intermediate tap 48 on the resistance 46 by way of a cathode glow tube 47. The intermediate tap map be adjustable on the resistance 46 as in conventional potentiometers.

The operation of the above described system is as follows: Assuming that alternating current is supplied to the terminals 31 of the transformer 29, a continuous direct current is supplied by the rectifier tubes 35—35 through the resistance 36 and the primary winding 5 of the transformer 4, and thence to the center tap 37 on the secondary winding 32 of the transformer 29. A portion of this direct current is taken off at a point between the tubes 35 and the resistance 36 and passed through the relay coil 41, thence through the tube 39 to the center tap 37. Assuming that there is no charge upon the condenser 6, the grid 44 of the tube 39 will be at the same potential as the cathode 38 and accordingly the tube 39 will conduct upon application of a positive potential to the anode 40. The plunger 42, which is of magnetic material, is accordingly drawn upwardly into the coil 41 and the rod 43 is moved upwardly forcing the armatures 15 against the contacts 13 and 14 to close the power supply circuit. The condenser 6 is charged through the rectifying tubes 7, so that the left hand side thereof is positive and the right hand side negative. A portion of the condenser potential is applied to the cathode glow tube 47 by way of the tap 48 of the potentiometer resistance 46. When the voltage across the condenser 6 exceeds a predetermined value the tube 47 becomes conductive. Since the tube 47 is connected to the grid 44, this grid now becomes negative relative to the cathode 38, conducting through the tube 39 is blocked, and current no longer flows through the coil 41 of the relay. The plunger 42 again assumes the position shown in the drawing and the power supply to the condenser 6 is terminated. The condenser 6 is discharged through the primary winding 5 of the transformer 4 upon the supply of an ignition impulse to the igniter 20 of the mercury pool type tube 17. It will be observed that this discharge is in the reverse direction to the flow of flux reset current from the rectifier tubes 34. Upon the reversal of the potential of the condenser 6, the series tube 17 is extinguished and the shunt tube 21 picks up to permit the decay current from the welding circuit, including the transformer 5, to decay substantially exponentially.

It will be seen that should the flux reset current fail for any reason, such as failure of the tubes 34, then the current to the coil 41 of the relay will fail and the armatures 15 will open the power supply circuit. If the tube 47 were omitted the blocking potential on grid 44 would rise gradually with the increase of charge on condenser 6. This would result in a gradual decline of the current in through the coil 41 and a corresponding gradual opening of the contacts 13—14. The present invention insures that the power supply circuit will be opened quickly, thus avoiding sparking at partially opened contacts.

By the invention as above described there is provided a means for terminating the supply of power to the energy storage means of a resistance welding system when the voltage upon the energy storage means exceeds a predetermined maximum value. Furthermore, upon failure of other portions of the circuit, such as the flux reset circuit, the power supply is also cut off so that non-uniform welds, due to variations in the residual flux of the welding transformer, are avoided.

The invention also provides an improved means for preventing serious overcharging of the condenser if for any reason, such as the failure of the grid 8' to properly limit the charging of the condenser, the predetermined maximum value is exceeded. It will be noted that the tube 47 does not break down until a predetermined voltage has been applied thereto. Voltage is thereupon applied to the grid 44 to block the flow of current through the coil 41 of the relay. The grid 44 is therefore not subjected to a gradual change in potential which might cause the current through the relay coil 41 to fluctuate. Thus, fluctuations of the armature 15 toward and away from the contacts 13 are avoided during the charging period of the condenser 6, and the armatures 15 are not moved until the charge on the condenser 6 exceeds a predetermined maximum value, at which time conduction through tube 39 is suddenly blocked upon which the power supply circuit is opened.

Although there has been herein described but a single embodiment of the invention, other embodiments within the scope of the claims will be obvious to those skilled in the art from a consideration of the teachings herein.

What is claimed is:

1. An electrical welding system comprising a source of power, a transformer having primary and secondary windings, a circuit for supplying energy from said power source through said primary winding in one direction to induce welding impulses through said secondary winding, means for resetting the flux in said transformer, and means responsive to a failure of said flux resetting means for disconnecting said source of power from said circuit.

2. An electrical welding system comprising a source of power, a transformer having primary and secondary windings, a circuit for supplying energy from said power source through said primary winding in one direction to induce welding impulses through said secondary winding, a source of direct current, means for connecting said source of direct current to said primary winding to supply current therethrough in a direction inverse to the direction of said energy impulses for resetting the flux in said transformer, and means responsive to a failure of said source of direct current for disconnecting said source of power from said circuit.

3. An electrical welding system comprising a source of power, a transformer having primary and secondary windings, a circuit for supplying energy from said power source through said primary winding in one direction to induce welding impulses through said secondary winding, a source of direct current, means for connecting said source of direct current to said primary winding to supply current therethrough in a direction to reset the flux in said transformer, and a relay energized by said source of direct current and adapted upon deenergization by failure thereof to disconnect said source of power from said circuit.

4. An electrical welding system comprising an energy storage device, a source of power for supplying energy to said storage device, a transformer having primary and secondary windings, means for supplying energy impulses from said energy storage device through said primary winding in one direction to induce welding impulses through said secondary winding, a source of direct current, means for connecting said source of direct current to said primary winding to supply current therethrough in a direction inverse to the direction of the energy impulses from said energy storage device for resetting the flux in said transformer, and means responsive to a failure of said source of direct current for disconnecting said energy storage device from said source of power.

5. An electrical welding system comprising an energy storage device, a source of power for supplying energy to said storage device, a transformer having primary and secondary windings, means for supplying energy impulses from said energy storage device through said primary winding in one direction to induce welding impulses through said secondary winding, a source of direct current, means for connecting said source of direct current to said primary winding to supply current therethrough in a direction inverse to the direction of the energy impulses from said energy storage device for resetting the flux in said transformer, circuit opening means for disconnecting said energy storage device from said source of power in response to a failure of said source of direct current, and means for actuating said circuit opening means in response to an excessive charge on said energy storage means.

6. An electrical welding system comprising an energy storage device, a source of power for supplying energy to said storage device, a transformer having primary and secondary windings, means for supplying energy impulses from said energy storage device through said primary winding in one direction to induce welding impulses through said secondary winding, a source of direct current, means for connecting said source of direct current to said primary winding to supply current therethrough in a direction inverse to the direction of the energy impulses from said energy storage device for resetting the flux in said transformer, and a relay energized by said source of direct current and adapted upon deenergization by failure thereof to disconnect said energy storage device from said source of power.

7. An electrical welding system comprising a condenser, a source of power for supplying energy to said condenser, a transformer having primary and secondary windings, means for supplying energy impulses from said condenser through said primary winding in one direction to induce welding impulses through said secondary winding, a source of direct current, means for connecting said source of direct current to said primary winding to supply current therethrough in a direction inverse to the direction of the energy impulses from said condenser for resetting the flux in said transformer, a relay energized by said source of direct current and adapted upon deenergization by failure of said direct current to disconnect said condenser from said source of power, and means responsive to an excessive charge on said condenser for also deenergizing said relay.

8. A condenser charging system comprising a condenser, a source of power, means for connecting said source of power to said condenser, means for opening and closing said connecting means, a source of current for actuating said opening and closing means, a rectifying tube for controlling the flow of current from said last-mentioned source to said opening and closing means, said tube including a control grid, means for deriving a potential from the charge on said condenser, a connection between said potential deriving means and said grid, and a cathode glow tube in said connection adapted to conduct when the potential upon said condenser exceeds a predetermined maximum to apply a cut off bias to said grid.

9. A condenser charging system comprising a condenser, a source of power, means for connecting said source of power to said condenser, a relay adapted upon energization to close said connecting means and upon deenergization to open the same, a source of current for energizing said relay, a rectifying tube for controlling the flow of current from said last-mentioned source of said relay, said tube including a control grid, means for deriving a potential from the charge on said condenser, a connection between said potential deriving means and said grid, and a cathode glow tube in said connection adapted to conduct when the potential upon said condenser exceeds a predetermined maximum to apply a cut off bias to said grid.

10. A condenser charging and discharging system comprising a condenser, a source of power, means for connecting said source of power to said condenser, means for opening and closing said connecting means, a discharge circuit for said condenser including a transformer, a source of current for resetting the flux in said transformer and for actuating said opening and closing means, a rectifying tube for controlling the flow of current from said last-mentioned source to said opening and closing means, said tube including a control grid, means for deriving a potential from the charge on said condenser, a connection between said potential deriving means and said grid, and a cathode glow tube in said connection adapted to conduct when the potential upon said condenser exceeds a predetermined maximum to apply a cut off bias to said grid.

11. A condenser charging and discharging system comprising a condenser, a source of power, means for connecting said source of power to said condenser, a relay adapted upon energization to close said connecting means and upon deenergization to open the same, a discharge circuit for said condenser including a transformer, a source of current for resetting the flux in said transformer and for energizing said relay, a rectifying tube for controlling the flow of current from said last-mentioned source through said relay, said tube including a control grid, means for deriving a potential from the charge on said condenser, a connection between said potential deriving means and said grid, and a cathode glow tube in said connection adapted to conduct when the potential upon said condenser exceeds a predetermined maximum to apply a cut off bias to said grid.

HANS KLEMPERER.